(12) United States Patent
Goodsell

(10) Patent No.: US 10,273,130 B2
(45) Date of Patent: Apr. 30, 2019

(54) AIRPLANE JACK APPARATUS

(71) Applicant: Vernon Roy Goodsell, Bend, OR (US)

(72) Inventor: Vernon Roy Goodsell, Bend, OR (US)

( * ) Notice: Subject to any disclaimer, the term of this patent is extended or adjusted under 35 U.S.C. 154(b) by 0 days.

(21) Appl. No.: 15/801,217

(22) Filed: Nov. 1, 2017

(65) Prior Publication Data

US 2018/0118537 A1    May 3, 2018

Related U.S. Application Data

(60) Provisional application No. 62/415,647, filed on Nov. 1, 2016.

(51) Int. Cl.
| | |
|---|---|
| *B64F 5/40* | (2017.01) |
| *B66F 3/24* | (2006.01) |
| *B66F 3/36* | (2006.01) |
| *B66F 3/42* | (2006.01) |
| *B66F 5/04* | (2006.01) |

(52) U.S. Cl.
CPC ............ *B66F 3/24* (2013.01); *B66F 3/36* (2013.01); *B66F 3/42* (2013.01); *B66F 5/04* (2013.01); *B64F 5/40* (2017.01)

(58) Field of Classification Search
CPC .. B66F 5/04; B66F 7/06; B66F 7/0641; B66F 7/08; B66F 7/085; B66F 3/245; B64F 5/50
See application file for complete search history.

(56) References Cited

U.S. PATENT DOCUMENTS

| | | | | |
|---|---|---|---|---|
| 2,603,454 A | * | 7/1952 | Newton | B62B 3/0618 254/10 C |
| 2,643,779 A | * | 6/1953 | Hamlin | B66F 5/04 254/242 |
| 2,814,394 A | * | 11/1957 | Witcher | B66C 23/48 254/124 |
| 3,797,675 A | * | 3/1974 | Moore | B66C 23/48 212/204 |
| 4,479,632 A | * | 10/1984 | McIntire | B66C 23/48 254/10 B |
| 4,899,985 A | * | 2/1990 | Good | B62B 3/0618 254/124 |
| 5,232,203 A | | 8/1993 | Butts | |
| 6,010,299 A | * | 1/2000 | Jesswein | B66F 5/00 254/8 R |
| 6,276,665 B1 | * | 8/2001 | Hawkins | B66C 23/48 254/124 |
| 6,457,700 B1 | * | 10/2002 | Hong | B66C 23/48 254/124 |
| 6,926,254 B1 | | 8/2005 | Nymann | |

(Continued)

FOREIGN PATENT DOCUMENTS

| | | | |
|---|---|---|---|
| FR | 2134130 A1 * | 12/1972 | B66F 3/24 |
| FR | 2134130 A1 * | 12/1972 | B66F 3/24 |

*Primary Examiner* — Tyrone V Hall, Jr.
(74) *Attorney, Agent, or Firm* — Thomas LaGrandeur

(57) ABSTRACT

An airplane jack apparatus for lifting a flat main spring landing gear includes a base that supports a hydraulic jack and an upright member, to which a lift arm is pivotably attached. The lift arm has a rotatable cross member that engages a piston that raises out of the hydraulic jack, and the lift arm has a horizontal lifting portion that engages the ground-facing end of a landing gear. The base of the airplane jack apparatus has wheels to allow the jack to move as the angle of a landing gear changes while being lifted.

20 Claims, 3 Drawing Sheets

(56) References Cited

U.S. PATENT DOCUMENTS

| | | | | |
|---|---|---|---|---|
| 7,004,454 B2 * | 2/2006 | Petrone | ............... | B66F 7/0625 |
| | | | | 254/10 B |
| 8,382,419 B2 * | 2/2013 | Agoncillo | ............... | B66F 9/18 |
| | | | | 414/546 |
| 8,448,921 B2 | 5/2013 | Hernandez | | |
| 8,608,130 B2 | 12/2013 | Gann | | |
| 8,960,645 B1 | 2/2015 | Stewart | | |
| 9,114,964 B2 | 8/2015 | Spinazze | | |

* cited by examiner

AIRPLANE JACK APPARATUS

This application claims the benefit of U.S. Provisional Application No. 62/415,647 filed Nov. 1, 2016.

FIELD OF THE INVENTION

The present invention relates to an airplane jack apparatus for lifting airplane wheels. More particularly, the invention relates to an airplane jack apparatus for safely and stably lifting the main spring landing gear of an airplane.

BACKGROUND

There are many ways to jack up an airplane that has a conventional landing gear configuration, with main front landing gear and a rear landing gear, to service a tire, wheel, or brakes. Many methods currently in use are precarious at best, and rarely jack up an airplane quickly or safely. The methods and devices currently used in lifting an airplane can result in lost time, injury, or damage to an airplane.

One approach that is typically used to lift an airplane with flat main gear legs typically made of steel or titanium incorporates devices that lift the front landing gear. A jack pad or similar device grips or is attached to a portion of the gear leg to allow other jack components to apply lifting force to the gear leg through the jack pad. Lifting of the gear leg in turn lifts the wheel assembly. This approach can be cumbersome, since jack pads or similar devices often must be reconfigured and readjusted, or disassembled and reassembled for lifting the gear leg. In addition, this approach can scratch, mark, or otherwise mar the gear leg. Another disadvantage of jacking up a gear leg in this manner is that the gear leg may flex as the airplane is lifted, requiring the airplane to be supported or blocked in place while initially raised so that jack components can be moved as the gear leg is lifted to a desired height. Moving the jack components is time consuming, and can be dangerous as an airplane can fall free from supports or the jack components as the jack components are moved.

Accordingly, there remains a need for a device and method of lifting an airplane that quickly and safely lifts an airplane by its main spring landing gear without risk of the landing gear sliding off the jack. In addition, there is a need for a jack that is adjustable so that it can be easily and quickly adjusted for different types of aircraft. The present invention addresses these needs.

SUMMARY OF THE INVENTION

The present technology is directed to an airplane jack apparatus for lifting a main spring landing gear of an airplane from a ground surface. The jack apparatus includes a horizontal base with a set of wheels attached to the base, an upright hydraulic jack attached to the base, the hydraulic jack having a vertically extending piston, an upright member attached to the rear of the horizontal base, and a rotatable lift arm that is pivotably attached at its rear side to the upright member and which has a rotatable cross member mounted between the left and right sides of the lift arm. The rotatable cross member of the lift arm is positioned over the hydraulic bottle jack and engages the piston that extends out of the hydraulic bottle jack. The rotatable lift arm has a horizontal lift portion that contacts and engages the end of the landing gear that faces the ground surface, below the landing gear portion that a wheel attaches to.

In a preferred embodiment, the airplane jack has front extension members at the left and right edges of the front of the horizontal base. The outer ends of the front extension members have wheels mounted in or to them, and the jack has at least one additional wheel mounted at the rear side of the jack. In this embodiment, the width of the front side of the horizontal base allows the front extensions to be positioned below a landing gear wheel when the jack is positioned to lift a landing gear, such that the portion of the landing gear wheel touching the ground surface will lie between the extension members and front wheels of the base.

The position of pivotable attachment of the lift arm to the upright member is vertically adjustable to different heights to the upright member. Accordingly, the height of the lift arm and the horizontal lift portion of the jack can be adjusted to accommodate and lift different heights of landing gear found in various airplanes. In a preferred embodiment, the upright member of the jack preferably has a series of vertically spaced holes in its left and right sides to allow the height of the lift arm to be adjustable.

The presently disclosed airplane jack provides a method of jacking up an airplane in which the jack is first placed or rolled into position so that the horizontal lift portion at the front end of the lift arm is under the ground surface-facing end of a landing gear. The hydraulic jack is actuated to raise the piston, thereby raising the lift arm by the rotatable cross member, with the horizontal lift portion of the lift arm commensurately raising the landing gear. While the main spring landing gear is raised, the angle of the landing gear to the ground surface will typically change as the landing gear wheel is lifted off the ground surface. The jack will roll to accommodate this change in angle, thereby safely and stably supporting the landing gear while it is being raised and in the raised position. The jack will likewise roll to support the landing gear while it is subsequently being lowered after use.

Some of the objectives of the invention having been stated, other objectives will appear as the description proceeds when taken in connection with the accompanying drawings.

DETAILED DESCRIPTION OF THE PREFERRED EMBODIMENTS

Figure 1:
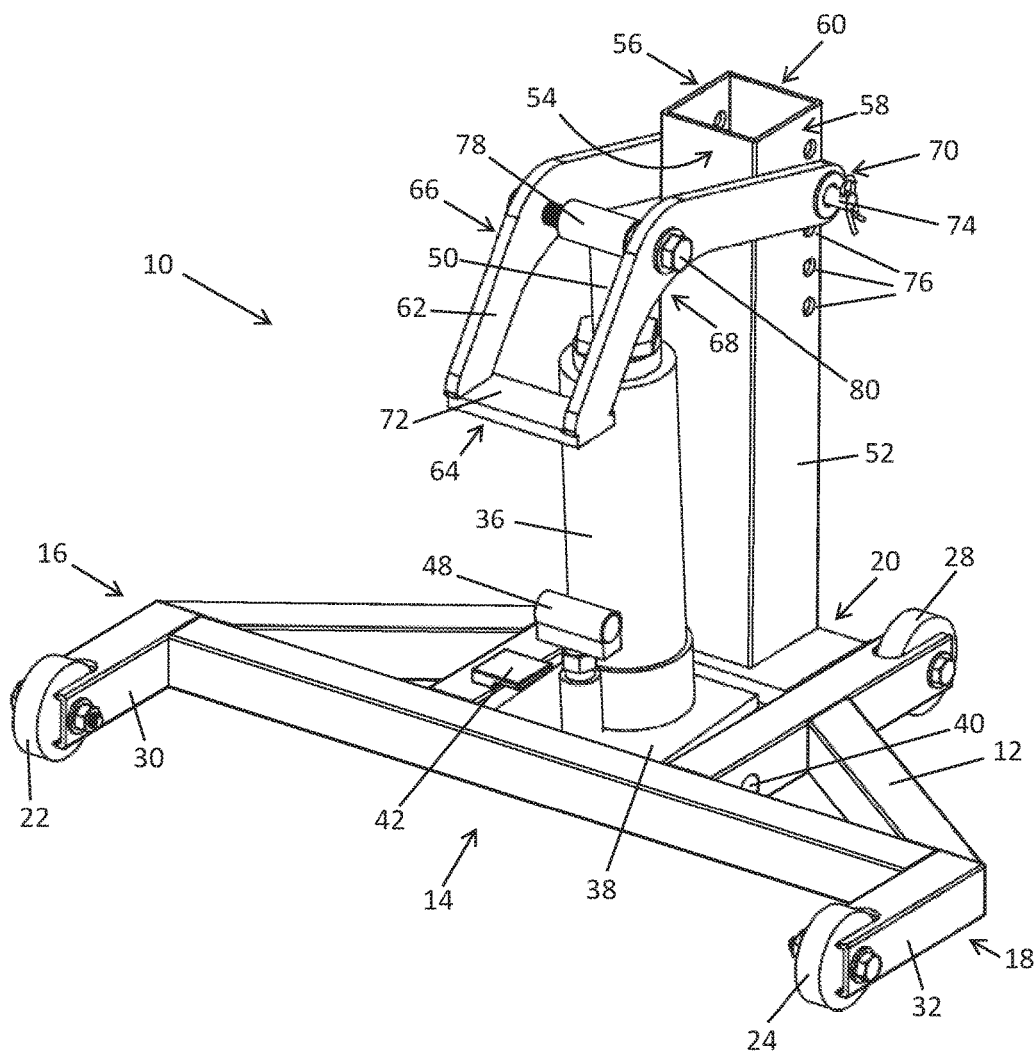
FIG. 1 is an angled top view of an airplane jack apparatus having a curved lift arm.

While the present technology is capable of various embodiments, there is shown in the drawings and described in detail specific embodiments with the understanding that the present disclosure exemplifies the principles of the technology and is not intended to limit the technology to the embodiments illustrated. It will be understood that like or analogous elements and/or components, referred to herein, may be identified throughout the drawings with like reference characters.

A preferred embodiment of the presently disclosed airplane jack apparatus is illustrated by the apparatus 10 shown in FIG. 1. This airplane jack apparatus 10 is adapted to lift an airplane to allow servicing of the tire, wheel, or brakes. In particular, the airplane jack apparatus 10 is adapted to lift the main spring gear leg of an airplane equipped with conventional landing gear (for example, but not limited to, aircraft sold under the trademark Cessna). As described below, the airplane jack 10 has an arm which is designed to lift the bottom of a landing gear by lifting against the end surface of the landing gear leg that faces the ground surface and is below the point of attachment of the wheel to the landing gear. Moreover, the airplane jack 10 has a set of at least three wheels that allow the jack to roll or move in and out, thereby maintaining positive lift and support of the airplane as the main spring landing gear typically moves or angles in while being lifted off the ground surface and moves or angles out while being lowered onto the ground surface. In this regard, the airplane jack 10 allows the landing gear to be safely moved in and out while lifted and stably supported by the jack. Accordingly, the airplane jack 10 allows the landing gear to be raised and moved without need for blocking the gear and repositioning the jack, as typically occurs with several currently used airplane jack systems and jacking methods.

The presently disclosed airplane jack apparatus 10 is also advantageously a compact, lightweight jack apparatus. The airplane jack 10 is accordingly easy to position for use and easy to store when not in use. The wheels of the airplane jack 10 allow the jack to be easily rolled into position for use. As described below, the airplane jack 10 can be readily adjusted to different heights, thereby allowing the jack to be used for many different applications in lifting a wide range of different landing gear that vary in height from the ground surface and end structure. Moreover, the airplane jack apparatus 10 can be further adapted to lift landing gear having different lift point configurations by attachment of an accessory lift piece that may have different configurations for specific lifting applications.

As used herein, the terms "airplane jack apparatus" and "airplane jack" are used interchangeably to refer to the entire airplane jack apparatus structure. As described below, the airplane jack apparatus employs a hydraulic jack or hydraulic bottle jack within the overall structure of the airplane jack apparatus or airplane jack.

FIG. 1 shows a preferred embodiment of the presently disclosed airplane jack apparatus 10. As shown, the airplane jack 10 has a horizontal base 12 that has a front side or proximal end 14, a left side 16, a right side 18, and a rear side or distal end 20 (FIGS. 1). The airplane jack 10 includes a set of wheels, such as those respectively depicted as the left front 22, right front 24, left rear 26 (not shown), and right rear 28 wheels. As shown in the preferred embodiment of an airplane jack 10, the base 12 of the jack generally may be shaped in a rhombus-like configuration, with the width of front side or proximal end 14 wider or greater than the width of the rear side or distal end 20 of the jack. In this configuration, the front side 14 of the jack 10 has a width that allows the front wheels 22 and 24 to be positioned below a landing gear wheel when the airplane jack 10 is in position to lift and support a landing gear. As shown, the front wheels 22 and 24 are each placed respectively at the front of members 30 and 32 that extend out on the front side 14 of the base 12. The left front 30 and right front 32 extension members as shown extend out from the edge of the front side 14 of the base at a 90-degree angle. This configuration of the left 30 and right 32 extension members allows for the front wheels 22 and 24 to be rolled into place under a landing gear wheel, such that the portion of the landing gear wheel touching the ground surface will lie between the front wheels 22 and 24 and the extension members 30 and 32. This configuration provides a stable footing for lifting a landing gear and supporting it while elevated off the ground. While the left front 30 and right front 32 extension members are depicted as straight members extending out at a 90-degree angle in a preferred embodiment, the extension members are not limited to such a configuration. The extension members may take the form of many different configurations and extension orientations, such as straight, angular, curved, etc., so long as the extension members may be rolled into place under a landing gear wheel.

The width of the front side 14 of the base 12 and the positioning of the wheels 22 and 24 help to stabilize the jack while it stably lifts and supports a landing gear. The narrower rear side 20 of the airplane jack 10 allows the jack to stably support a landing gear and have an overall compact size. Portions of the left 16 and right 18 sides of the base 12 as shown angle back to connect the wider front side 14 of the base to its narrower rear side 20. This configuration allows the jack 10 to be stable yet compact and light weight. Moreover, the base 12 as shown is constructed from hollow, tubular steel, aluminum, or a similar material to impart strength to the jack 10 while keeping it compact and lightweight. Although the horizontal base 12 is shown in a preferred rhombus-like configuration with extending members 30 and 32, the airplane jack 10 is not limited to this shape and can have any number of shapes, such as rectangular, semi-circular, crescent, and so forth. Preferably, the horizontal base 12 has a configuration that allows the front wheels 22 and 24 to be positioned under a landing gear wheel, fore and aft of the portion of the landing gear wheel that contacts the ground surface.

The horizontal base 12 of the airplane jack 10 has an upright, vertical hydraulic jack 36 positioned near or approximately at the center or a midpoint of the horizontal base 12 of the airplane jack 10. The hydraulic bottle jack 36 may be held in place in any number of ways. Preferably, the hydraulic bottle jack 36 is pivotably positioned and held within the airplane jack base in a manner that allows the hydraulic bottle jack to move or rock both forward and backward from a straight, upright position. In one exemplary embodiment, the flat base 38 of the hydraulic bottle jack 36 is positioned and held in place within the base 12 of the airplane jack 10. In this embodiment, the underside of the flat base 38 of the hydraulic bottle jack 36 rests on a pivot support member 40, such as a triangular angle iron or cylindrical tube, that runs under the width of the flat base 38 of the hydraulic bottle jack 36. The flat base 38 of the hydraulic bottle jack 36 can accordingly rock forward or backward on the pivot support member 40. The hydraulic bottle jack 36 is held in place by a tab or cover 42 that covers a portion of the top of the base 38 of the hydraulic bottle jack 36. In a preferred embodiment, the cover 42 is a triangular upper cover that sits over a front corner of the top of the base 38 of the hydraulic bottle jack 36 to hold the bottle jack 36 in place. Alternatively, the tab or cover 42 can extend over part of the side of the base 38 of the hydraulic bottle jack 36 to hold it in place.

Figure 2:
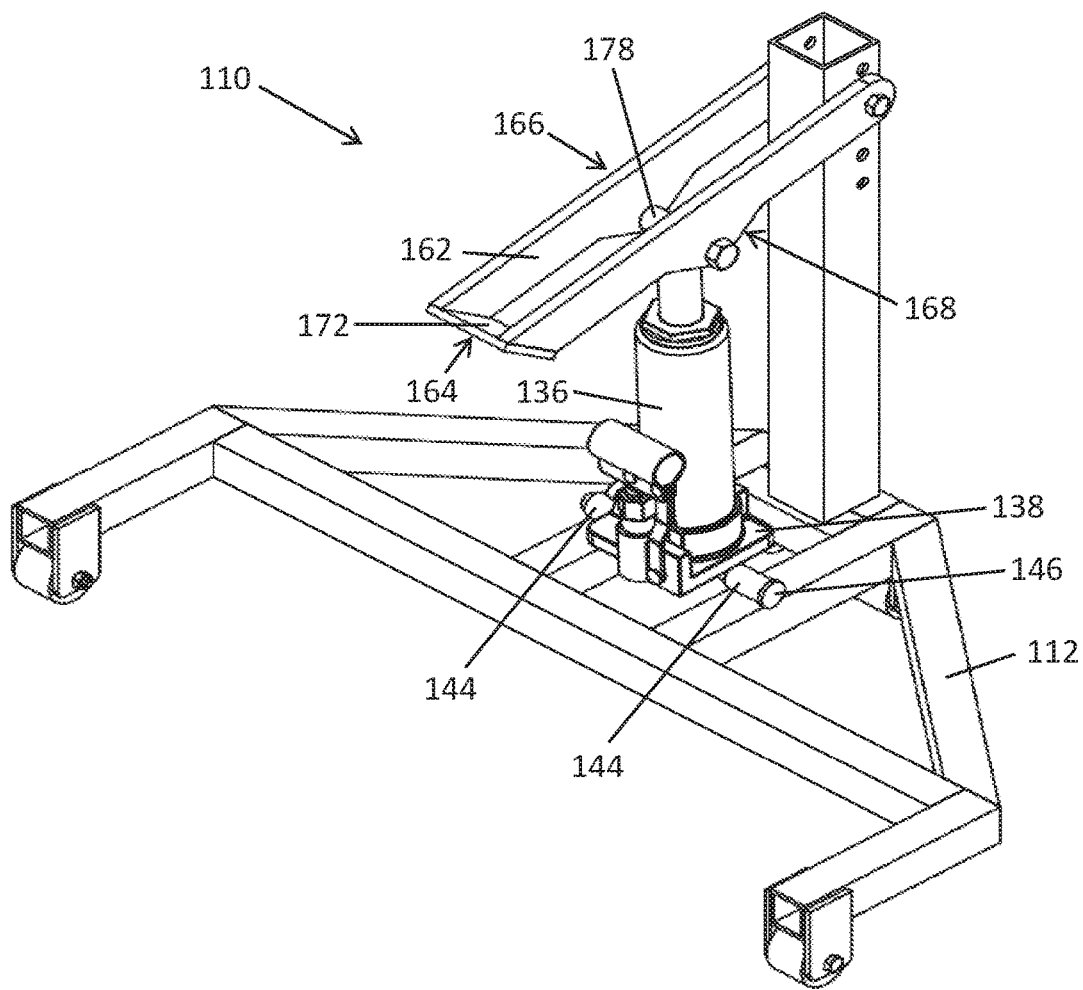
FIG. 2 is an angled top view of an airplane jack apparatus having a straight lift arm.

An alternative preferred embodiment of an airplane jack apparatus 110 is shown in FIG. 2. In this embodiment, the hydraulic bottle jack 136 is pivotably attached to the horizontal base 112 by a pivoting means or mechanism as shown in FIG. 2. In this exemplary embodiment, the bottle jack 136 is attached to the horizontal base 112 by a tube mechanism that allows the bottle jack 136 to pivot. A base plate is attached to the underside of the base 138 of the bottle jack 136 and a tube is attached to the underside of the base plate.

Pieces of tubing 144 are likewise attached to the horizontal base 112 of the airplane jack 110. The tube on the base plate is aligned with the tubing 144 on the airplane jack base 112, and a pin 146 slides through the tubing to hold the base 138 of the bottle jack 136 in place on the horizontal base 112 of the airplane jack 110.

The hydraulic bottle jack 36 shown in FIG. 1 typically will have a pivotable yoke 48 that is adapted to receive a removable handle or hand lever (not shown), whereby the yoke is configured to apply a pumping action to a hydraulic press within the bottle jack 36 when the yoke 48 is rotated up and down with the handle. Manual activation of the handle results in a piston 50 being vertically pushed up from the hydraulic bottle jack 36, to allow the piston 50 to impart a lifting force. The hydraulic bottle jack 36 has a relief valve for releasing pressure, allowing the piston 50 to be lowered back into the bottle jack 36. Typically, a handle attached to the hydraulic bottle jack can conveniently open the relief valve.

An upright, vertical member 52 is positioned at the rear side or distal end 20 of the airplane jack 10 to the rear of the hydraulic bottle jack 36 (FIG. 1). The upright member 52 typically will be formed of a hollow, tubular steel, aluminum, or similar material to impart suitable strength to the jack 10 for stably lifting an aircraft by a landing gear. In the preferred embodiment shown in FIG. 1, the upright member 52 has a square cross section having a front side 54, a left side 56, a right side 58, and rear side 60. Attached to the upright member is a rotatable lift arm 62 having a front end or proximal side 64, a left side 66, a right side 68, and a rear or distal end 70. In this preferred embodiment, the lift arm 62 has a curved configuration. Between the left 66 and right 68 sides of the lift arm 62 lies a lift portion or pad 72 that connects the left 66 and right 68 sides at the front side or proximal end 64 of the lift arm 62. The rear or distal end 70 of the lift arm 62 is pivotably connected to the upright member 52, as the rear of the left 66 and right 68 sides of the lift arm 54 are respectively connected to the left 56 and right 58 sides of the upright member 52. The lift arm 62 therefore extends beyond a position that is vertically directly above the front side or proximal end 14 of the base 12, such that the lift pad or lift portion 72 may be positioned under the ground surface-facing end of a landing gear for lifting the landing gear. As shown in FIG. 1, the lift arm 62 may be pivotably connected to the upright member 52 by a horizontal rod, bolt, or similar connecting device 74 that travels through holes bored in the left 66 and right 68 sides of the lift arm 62 and corresponding holes bored in the left 56 and right 58 sides of upright member 52.

The lift arm 62 may be pivotably attached to the upright member 52 at any one of several different heights to allow height of the pivotable attachment of the lift arm 62 to the upright member 52 to vertically adjusted. In this manner, the height of the lift arm 62 and its horizontal lift pad 72 are adjustable to allow the airplane jack 10 to be used to lift landing gears of varying heights, and thereby be used to jack up a wide variety of airplanes. In the preferred embodiment shown in FIG. 1, the left 56 and right 58 sides of the upright member 52 contain a series of holes 76 spaced vertically apart from one another, with the holes of the left 56 and right 58 sides horizontally aligned to receive the horizontal connecting device 70. These holes 76 allow the rear end 70 of the lift arm 62 to be placed at different heights on the upright member 52.

A rotatable, hollow, horizontal cross member 78 lies between the left 66 and right 68 sides of the lift arm 62, at a midpoint approximately midway between the front side 64 and rear end 70 of the lift arm 62. The rotatable cross member 78 is held between holes in the left 66 and right 68 sides of the lift arm 62 by a rod, bolt, or similar device 80 that travels through the hollow, rotatable cross member 78 and holes bored in the left 66 and right 68 sides of the lift arm 62. The rotatable cross member 78 lies directly above the hydraulic bottle jack 36, and engages the piston 50. The rotatable cross member 78 may engage the piston 50 by receiving the piston 50 in a receptacle that is shaped to cover or receive the top of the piston 50. Alternatively, the rotatable cross member 78 may be permanently attached to the top of piston 50, such as by welding. Raising the piston 50 from the hydraulic bottle jack 36 in turn raises the rotatable cross member 78 and the lift arm 62. Rotation of the cross member 78 within the left 66 and right 68 sides of the lift arm 62 allows the cross member 78 to remain positioned over the piston 50 as the piston 50 and lift arm 62 is raised while jacking up a landing gear Likewise, the cross member 78 remains positioned over the piston 50 when the piston 50 and lift arm 62 are lowered. The position of the cross member 78 over the piston 50 is further facilitated by the ability of the bottle jack 36 to move or rock forward and backward (or proximal and distal) relative to the base 12 of the airplane jack 10. The bottle jack 36 can rock forward at the lowest position of the lift arm 62, and rock backward toward the upright member 52 as the piston 50 extends from the bottle jack 36 while jacking up a landing gear. Likewise, the bottle jack 36 can rock forward away from the upright member 52 as the piston 50 lowers into the bottle jack 36 when the lift arm 62 is lowered.

In the preferred embodiment of the airplane jack apparatus shown in FIG. 1, the left 66 and right 68 sides of lift arm 62 have a bent configuration such that at rest or in a lowered position, the front portions of the left 66 and right 68 sides of lift arm 62 extend out and below the horizontal cross member 78. With this configuration, the horizontal lift pad 72 at the front end 64 of the lift arm 62 is extended out and lies below the horizontal cross member 78. This low position of the horizontal lift pad 72 allows the lift pad 72 to fit underneath the end of a landing gear that is in close proximity to the ground surface.

In an alternative preferred embodiment of the airplane jack apparatus shown in FIG. 2, the left 166 and right 168 sides of lift arm 162 have a straight configuration. In this configuration, the lift pad 172 at the front end 164 of the lift arm 162 is extended out and lies slightly above, even with, or slightly below the horizontal cross member 178. The lift pad 172 extends beyond a position that is vertically directly above the distal end of the horizontal base 112. The straight configuration of the lift arm 162 allows the airplane jack 10 to lift aircraft with a higher lift point compared to a lower lift point that is in closer proximity to the ground surface and better suited for the bent configuration of the lift arm 62.

As described above, the horizontal lift arm 62 of the airplane jack 10 is designed to lift under the ground facing portion of a main spring landing gear. The airplane jack 10 can be built to different dimensions and sizes to accommodate jacking or lifting of differently sized and configured airplanes and their respective landing gear. The versatility to accommodate jacking or lifting of differently configured landing gear is further enhanced by the ability to attach an accessory lift piece or attachment to the lift arm 62 of the airplane jack 10. In a preferred embodiment, the accessory lift piece is attached to the lift pad or lift portion 72 of the lift arm 62. The accessory attachment can be configured in any number of different designs to allow use of the airplane jack 10 for different landing gear configurations.

Figure 3A:
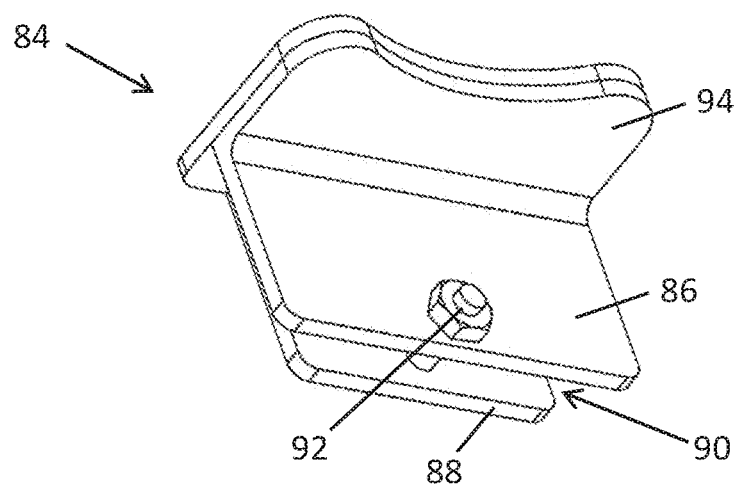
FIG. 3a is an angled view of an accessory lift piece that attaches to the lift arm of an airplane jack apparatus.
Figure 3B:
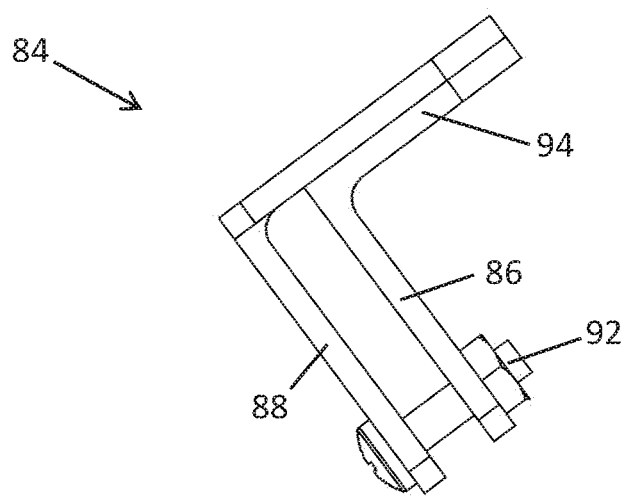
FIG. 3b is a side view of the accessory lift piece.

An exemplary accessory piece 84 is shown in FIGS. 3a and 3b, in which the accessory piece is configured to attach to the lift pad 72 of the lift arm 62. The accessory piece 84 has upper 86 and lower 88 plates that form a slot 90 designed to fit over the lift pad 72 of the lift arm 62. Once the accessory piece 84 is placed over the lift pad 72, it is securely held in place by a nut and bolt 92 or similar removable fastening means. The accessory piece 84 has a lift pad 94 that has a different configuration than the standard lift pad 72, allowing the airplane jack 10 to be used to lift a different landing gear configuration compared to the landing gear that can be lifted by the standard lift pad 72.

The presently described airplane jack 10 provides a method of jacking up a main spring landing gear that is both safe and fast compared to other methods. The airplane jack 10 can be easily placed into position for jacking up a landing gear, given its compact size, light weight, and rolling capability. Once the airplane jack 10 is placed in close proximity to a landing gear to be lifted or jacked up, the jack 10 can be readily rolled into position whereby the horizontal lift pad 72 is positioned under a landing gear. A removable handle is then used to pump the hydraulic bottle jack 36 and raise the piston 50, thereby raising the lift arm 62 through lifting and rotation of the rotatable, horizontal cross member 78. As the lift arm 62 raises, the horizontal lift pad 72 is raised, thereby raising the landing gear. The angle of the main spring landing gear typically will change as it is raised. The wheels of the airplane jack 10 will roll in conjunction with the change of angle in the landing gear as it is raised to enable the jack 10 to continuously support the landing gear in a safe, stable configuration while the landing gear is both being raised and while in a raised position. In particular, while the landing gear is raised and supported by the airplane jack, it can be safely moved inward and outward. The airplane jack 10 likewise will stably support the landing gear as it is lowered by releasing hydraulic pressure in the hydraulic bottle jack 36, thereby lowering the piston 50, the lift arm 62 and the horizontal lift pad 72.

While the presently disclosed airplane jack has been described as having particular configurations disclosed herein, the present technology can be further modified within the spirit and scope of this disclosure. This application is therefore intended to cover any variations, uses, or adaptations of the technology using its general principles. Further, this application is intended to cover such departures from the present disclosure as come within known or customary practice in the art to which this technology pertains and which fall within the limits of the appended claims.

What is claimed is:

1. A jack apparatus for lifting a flat main spring landing gear of an aircraft from a ground surface, the jack apparatus comprising:
    a horizontal base having a front side, a rear side, a left side and a right side;
    a set of wheels attached to the horizontal base;
    an upright hydraulic jack positioned on the horizontal base, the hydraulic jack having a piston that extends vertically out of the hydraulic jack;
    an upright member attached to the rear of the horizontal base, the upright member having a front side, a rear side, a left side, and a right side;
    a lift arm having a front side, a left side, a right side, and a rear end, wherein the rear end of the lift arm is pivotably attached to the upright member;
    a rotatable cross member that horizontally lies between the left and right sides of the lift arm, a horizontal support member that horizontally lies between the left and right sides of the lift arm, wherein the horizontal support member travels through and engages the rotatable cross member, such that the rotatable cross member is positioned to rotate about the horizontal support member;
    wherein the rotatable cross member is positioned between the front side and rear end of the lift arm over the hydraulic jack, such that the rotatable cross member engages the piston that extends vertically out of the hydraulic jack; and
    a lift portion configured to lift a landing gear end, the lift portion lying at the front side of the lift arm and bridging the left and right sides of the lift arm between a first front end point of the left side of the lift arm and a second front end point of the right side of the lift arm, wherein the lift portion has a lifting surface that lies between and is attached to the first and the second front end points of the left and right sides of the lift arm respectively.

2. The jack apparatus according to claim 1, wherein the hydraulic jack is pivotably positioned within the horizontal base, the hydraulic jack having a base positioned to lie above and unattached to a pivot support member, wherein the jack is held in place above the pivot support member by a cover positioned above a portion of a top surface of the base of the hydraulic jack.

3. The jack apparatus according to claim 1, wherein the hydraulic jack is pivotably attached to the horizontal base.

4. The jack apparatus according to claim 1, wherein the front side of the horizontal base has a front edge, a front edge cross member between the left and right sides of the horizontal base, the front edge cross member being wider than the rear side of the horizontal base,
    wherein a first extension member positioned at a left end of the front edge extends out from a left front edge of the front edge cross member, and a second extension member positioned at a right end of the front edge extends out from a right front edge of the front edge cross member.

5. The jack apparatus according to claim 4, wherein the set of wheels contains at least three wheels, with a first wheel positioned at a front edge of the first extension member, a second wheel is positioned at a front edge of the second extension member, and a third wheel is positioned at the rear side of the horizontal base.

6. The jack apparatus according to claim 5, wherein the front side of the horizontal base has a width dimensioned for placement of the jack apparatus such that the first and second wheels and the front edges of the first and second extension member are positioned below a landing gear wheel when the airplane jack is at rest and in position for the lift portion to lift and support an end of a landing gear, whereby the landing gear wheel portion touching the ground surface lies between the first and second wheels and the front edges of the first and second extension members.

7. The jack apparatus according to claim 4, wherein the set of wheels contains four wheels, with a first wheel positioned at a front edge of the first extension member, a second wheel positioned at a front edge of the second extension member, a third wheel positioned at a left edge of the rear side of the horizontal base, and a fourth wheel positioned at a right edge of the rear side of the horizontal base.

8. The jack apparatus according to claim 1, wherein the horizontal base has a configuration in which the front side of the jack is wider than the rear side of the jack, and wherein a cross member lies between a left front end and a right front end of the front side of the jack apparatus.

9. The jack apparatus according to claim 1, wherein pivotable attachment of the rear end of the lift arm to the upright member is vertically adjustable to different heights of points of pivotable attachment of the lift arm directly to the upright member.

10. The jack apparatus according to claim 1, wherein the lift arm has a curved configuration.

11. The jack apparatus according to claim 1, wherein the lift arm has a straight configuration.

12. The jack apparatus according to claim 1, further comprising an accessory lift piece attached to the front end of the lift arm, the accessory lift piece configured to lift the end of a landing gear and having a different lifting configuration than a lifting configuration of the lift portion.

13. The jack apparatus according to claim 1, further comprising an accessory lift piece attached to the lift portion of the lift arm, the accessory lift piece configured to lift the end of a landing gear and having a different lifting configuration than a lifting configuration of the lift portion.

14. A jack apparatus for lifting a main spring landing gear of an aircraft from a ground surface, the jack apparatus comprising:
  a horizontal base having a proximal end, and a distal end;
  a set of wheels attached to the horizontal base;
  an upright hydraulic jack positioned at a midpoint on the horizontal base, the hydraulic jack having a piston that extends vertically out of the hydraulic jack;
  an upright member attached at the distal end of the horizontal base;
  a lift arm having a proximal and distal end, a left side between the proximal and distal ends, and a right side between the proximal and distal ends, wherein the distal end of the lift arm is pivotably attached to the upright member;
  a rotatable cross member positioned at a midpoint in the lift arm between the left and right sides of the lift arm, a support member that travels through the rotatable cross member, wherein the rotatable cross member is positioned to engage and rotate about the support member and engages the piston that extends vertically out of the hydraulic jack; and
  a lift portion configured to lift a landing gear end, the lift portion bridging endpoints of the left and right sides of the lift arm that lie at the proximal end of the lift arm; wherein the lift portion has a lifting surface that lies between and is attached to the endpoints of the left and right sides of the lift arm respectively.

15. The jack apparatus according to claim 14, wherein the hydraulic jack is pivotably positioned within the horizontal base, the jack having a base positioned to lie above and unattached to a pivot support member, wherein the jack is held in place above the pivot support member by a cover positioned above a portion of a top surface of the base of the hydraulic jack.

16. The jack apparatus according to claim 14, wherein the hydraulic jack is pivotably attached to the horizontal base.

17. The jack apparatus according to claim 14, wherein pivotable attachment of the distal end of the lift arm to the upright member is vertically adjustable to different heights of points of pivotable attachment of the lift arm directly to the upright member.

18. The jack apparatus according to claim 14, wherein the proximal end of the horizontal base has a proximal cross member between a left side and a right side of the horizontal base at the proximal end of the horizontal base, the proximal cross member being wider than the distal side of the horizontal base;
  a first extension member positioned at a first edge of the proximal end of the horizontal base;
  a second extension member positioned at a second, opposite edge of the proximal end of the horizontal base;
  wherein a first wheel is attached to the first extension member and a second wheel is attached to the second extension member;
  wherein at least one wheel is attached at the distal end of the horizontal base; and
  wherein the proximal end of the horizontal base has a width dimensioned such that the first and second extension members are configured to be positioned below a landing gear wheel when the airplane jack is at rest and in position to lift and support an end of a landing gear, whereby the landing gear wheel portion touching the ground surface lies between the first and second extension members.

19. The jack apparatus according to claim 14, further comprising an accessory lift piece attached to the lift arm, the accessory lift piece configured to lift the end of a landing gear and having a different lifting configuration than a lifting configuration of the lift portion.

20. The jack apparatus according to claim 14, wherein the horizontal base has a configuration in which the proximal end of the jack is wider than the distal end of the jack, and a cross member lies between a left front end and a right front end of the proximal end of the jack apparatus.

* * * * *